United States Patent
Ge et al.

(10) Patent No.: US 7,634,838 B2
(45) Date of Patent: Dec. 22, 2009

(54) HINGE AND A MOBILE PHONE WITH THE HINGE

(75) Inventors: Peng-Jin Ge, Shenzhen (CN); Rui-Hao Chen, Shenzhen (CN); Xing-Huang Luo, Shenzhen (CN); Gang Yang, Shenzhen (CN); Tai-Jun Liu, Shenzhen (CN); Hsiao-Hua Tu, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 765 days.

(21) Appl. No.: 11/253,894

(22) Filed: Oct. 19, 2005

(65) Prior Publication Data

US 2006/0085947 A1   Apr. 27, 2006

(30) Foreign Application Priority Data

Oct. 22, 2004  (TW) ............................... 93132131 A

(51) Int. Cl.
*E05F 1/08* (2006.01)
(52) U.S. Cl. ...................................................... 16/303
(58) Field of Classification Search ............. 16/303, 16/330, 334, 336, 307, 308; 379/433.12, 379/133.13; 455/575.1, 575.3, 576.4, 550.1, 455/90.3; 348/373, 794, 333.06
See application file for complete search history.

(56) References Cited

U.S. PATENT DOCUMENTS

| | | | |
|---|---|---|---|
| 5,109,571 A * | 5/1992 | Ohshima et al. ............... | 16/307 |
| 5,398,378 A * | 3/1995 | Lin .............................. | 16/303 |
| 6,070,298 A * | 6/2000 | Sorimachi ..................... | 16/330 |
| 6,823,067 B1 * | 11/2004 | Kubota ................... | 379/433.13 |
| 6,886,221 B2 * | 5/2005 | Minami et al. ................ | 16/324 |
| 2005/0225092 A1 * | 10/2005 | Conlon ......................... | 290/55 |

* cited by examiner

*Primary Examiner*—Chuck Y. Mah
(74) *Attorney, Agent, or Firm*—Steven M. Reiss

(57) ABSTRACT

A hinge (200) is provided in connection with a mobile phone. The hinge includes a shaft (21), a cam (22), a sleeve (25), a torsion spring (24) and a compression spring (23). The shaft includes a first end with two rotatable blocks (211) formed thereon and a second opposite end. The cam includes a first cam end having a flat surface (2230), an intermediate portion (221), a second cam end. The cam surrounds the shaft with the rotatable blocks abutting against the flat surface and being rotatable relative to the cam. The sleeve includes a first end engaged with the second cam end of the cam, and a second end abutting the second end of the shaft. The torsion spring has an inner finger (242) coupled to the shaft, and an outer finger (241) coupled to the sleeve. The compression spring surrounds the intermediate portion of the cam.

16 Claims, 5 Drawing Sheets

HINGE AND A MOBILE PHONE WITH THE HINGE

FIELD OF THE INVENTION

The present invention relates to a hinge having a torsion spring, and to a mobile phone incorporating the hinge.

BACKGROUND OF THE INVENTION

Hinges are almost universally used in flip mobile phones. The mobile phones typically include two housings. Normally, one of the housings, called a main body, contains most of the electronic elements of the mobile phone. The other housing, called a cover, contains fewer or even no electronic elements. The hinges are used to interconnect the main body and the cover, and to enable the cover to be foldable relative to the main body.

One kind of hinge mechanism is illustrated in FIG. 5. The hinge mechanism 500 includes: a cam 510 having a wedge-shaped portion 512 on one end, and a engaging portion 514 on the other end which is used for engaging with a cover of the mobile phone; a corresponding cam follower 520 having two jaws 522; and a spring 530 for pressing the cam follower 520 to urge against the cam 510. The cam 510, the cam follower 520 and the spring 530 are received in a hinge housing 540, which is, in turn, covered by a hinge cover 550. The hinge housing 540 and hinge cover 550 are engaged with a body of the mobile phone. In use, the wedge-shaped portion 512 moves along the jaws 522. The cam 510 together with the cover rotates relative to the body of the mobile phone in a predetermined direction. However, the rotating range of the cover is limited. In addition, the rotation of the hinge mechanism 500 is unstable.

What is needed, therefore, is a hinge adapted for mounting between a main body and a cover of a mobile phone, the hinge being capable of providing stable rotation therebetween.

SUMMARY

A hinge according to a preferred embodiment of the present invention includes a shaft, a cam, a sleeve, a torsion spring and a compression spring. The shaft includes a first end with two rotatable blocks formed thereon and a second opposite end. The cam includes a first cam end having a flat surface, an intermediate portion, a second cam end. The cam surrounds the shaft with the rotatable blocks abutting against the flat surface and being rotatable relative to the cam. The sleeve includes a first end engaged with the second cam end of the cam, and a second end abutting the second end of the shaft. The torsion spring has an inner finger coupled to the shaft, and an outer finger coupled to the sleeve. The compression spring surrounds the intermediate portion of the cam.

A main advantage of the hinge is that all the elements of the hinge are integrated together, to be a whole. Therefore, the hinge has a steady structure. The hinge is conveniently attached in the main body and the cover of the mobile phone.

A mobile phone with the hinge is provided. In a preferred embodiment according to the present invention, a mobile phone with the hinge comprises a main body, a cover, and the hinge connecting the main body and the cover. The main body comprises a lock mechanism used for locking the cover of the mobile phone. The hinge includes a shaft, a cam, a sleeve, a torsion spring and a compression spring. The shaft includes a first end with two rotatable blocks formed thereon, and a second opposite end. The cam includes a first cam end having a flat surface, an intermediate portion, a second cam end. The cam surrounds the shaft with the rotatable blocks abutting against the flat surface and being rotatable relative to the cam. The sleeve includes a first end engaged with the second cam end of the cam, and a second end abutting the second end of the shaft. The torsion spring has an inner finger coupled to the shaft, and an outer finger coupled to the sleeve. The compression spring surrounds the intermediate portion of the cam. The main body and the cover are connected with the shaft and the sleeve respectively.

A main advantage of the mobile phone is that the hinge connecting the main body and the cover of the mobile phone is integrated into a complete unit. Therefore, the hinge has a steady structure. The hinge is conveniently attached in the main body and the cover of the mobile phone. The mobile phone is easy to open or close.

Other advantages and novel features will become more apparent from the following detailed description when taken in conjunction with the accompanying drawings, in which:

DETAILED DESCRIPTION OF PREFERRED EMBODIMENT

Figure 1:
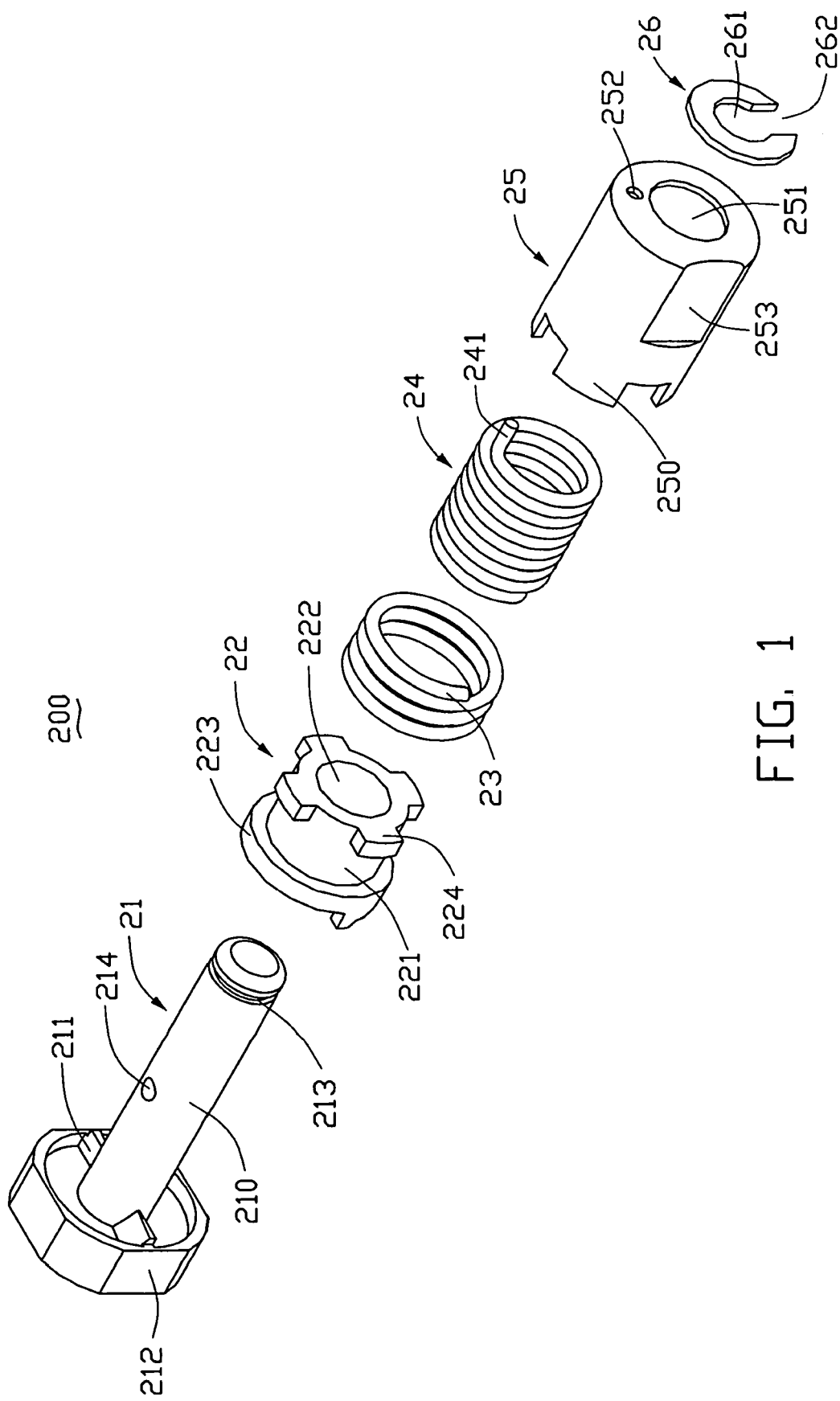
FIG. 1 is an exploded, isometric view of a hinge in accordance with a preferred embodiment of the present invention.
Figure 2:
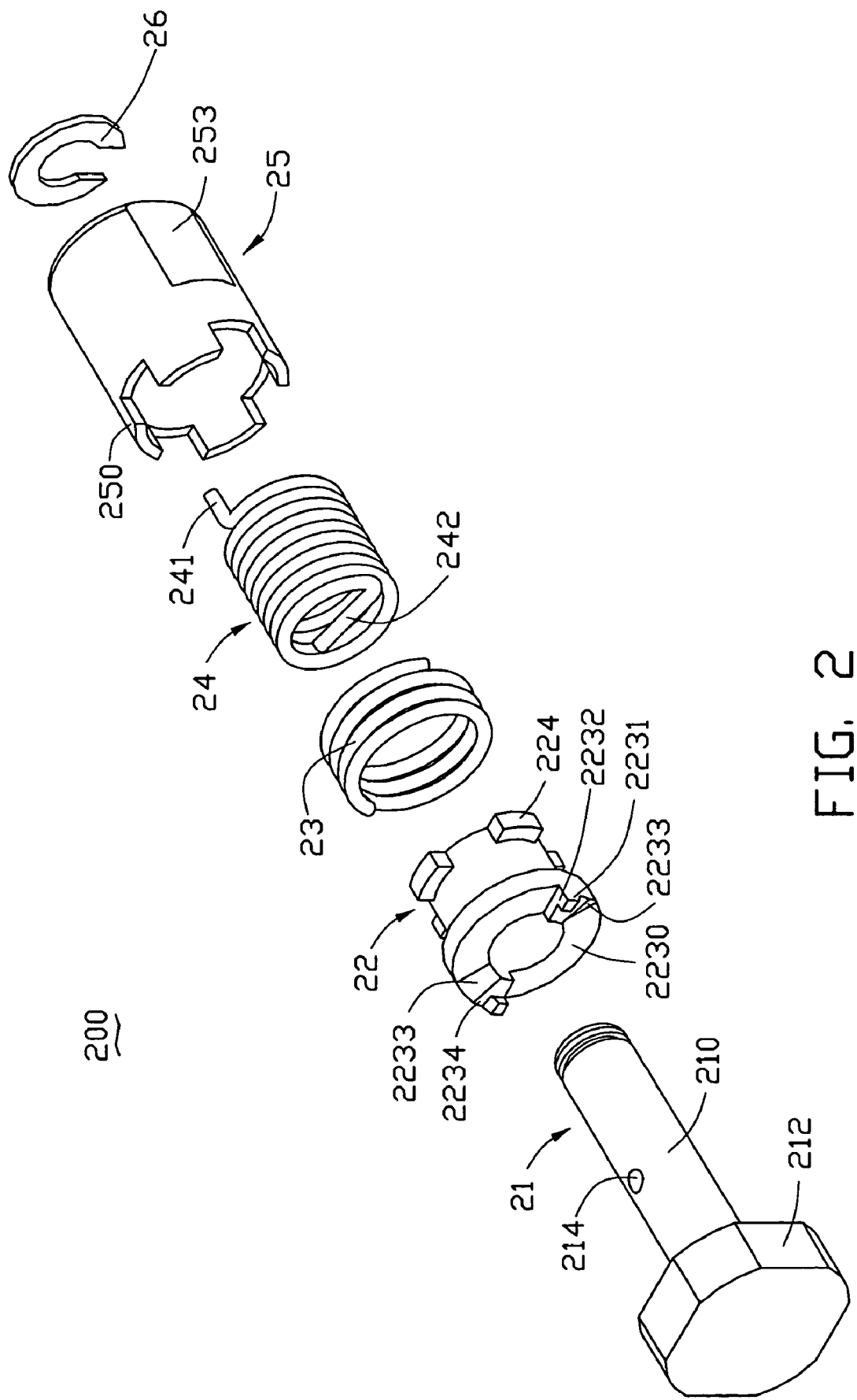
FIG. 2 is similar to FIG. 1, but viewed from another aspect.
Figure 3:
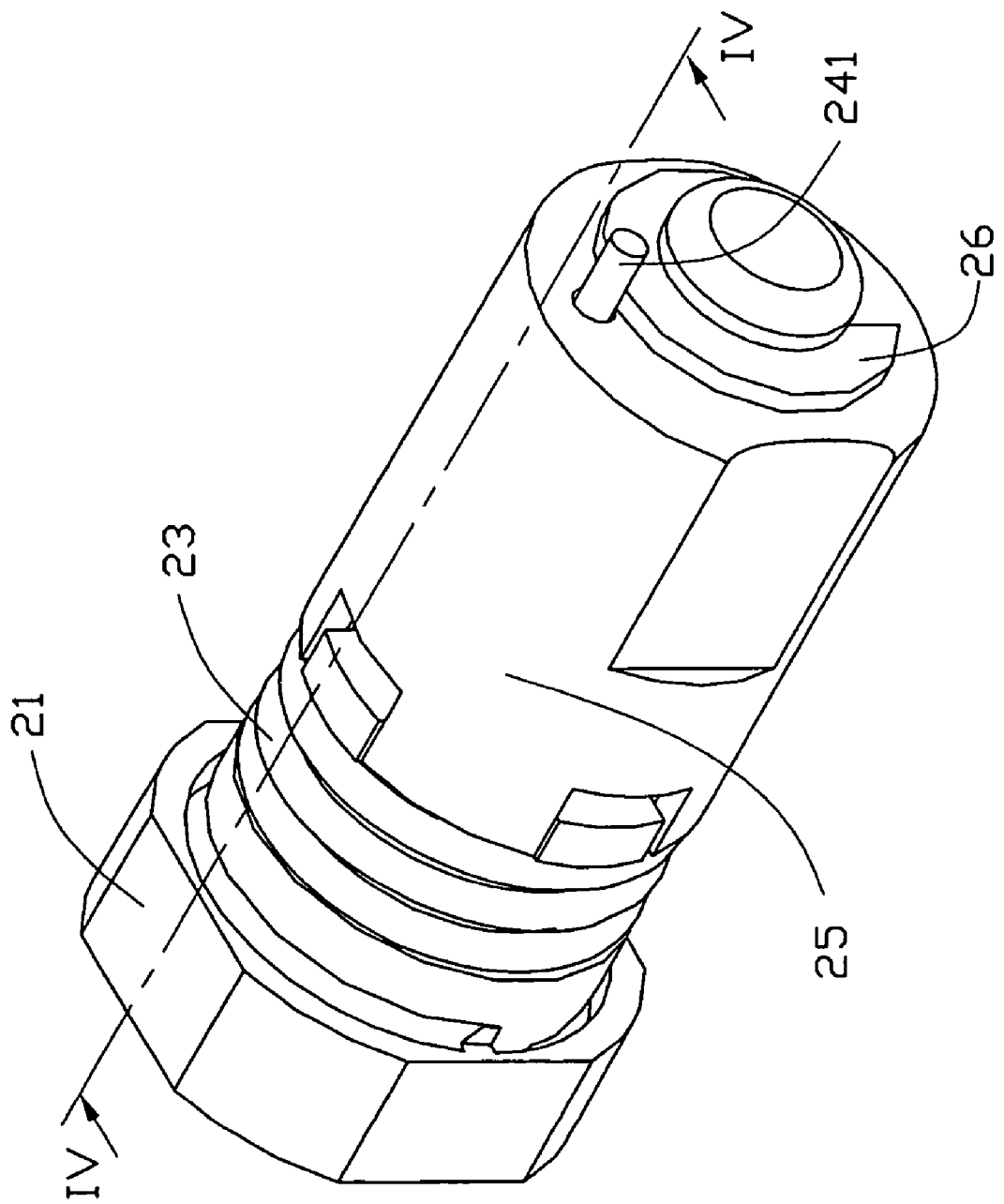
FIG. 3 is an isometric view of the assembled hinge of FIG. 1.

FIG. 3 shows a hinge according to the preferred embodiment of the present invention, which may be used to interconnect components like a main body (not shown) and a cover (not shown) of an electronic device like a foldable mobile phone. Also referring to FIGS. 1 and 2, the hinge 200 includes a shaft 21, a cam 22, a compression spring 23 as one of resilient members, a torsion spring 24 as another of the resilient members, a sleeve 25, and a clip 26. The compression spring 23 surrounds the cam 22. The shaft 21 extends through the cam 22 with the compression spring 23, the torsion spring 24, the sleeve 25 and the clip 26 in that order, thereby constituting the resultant assembled hinge 200 as shown in FIG. 3.

The shaft 21 includes a shaft body 210. A pair of rotatable blocks 211 is formed at a first end of the shaft body 210. A locking portion 212 is formed on the rotatable blocks 211. The locking portion 212 is securely engaged with the main body of the mobile phone, so that the shaft 21 cannot rotate relative to the main body. A groove 213 is defined in a second opposite end of the shaft body 210. A fixing hole 214 is defined in a middle of the shaft body 210.

The cam 22 includes a first end, a second opposite end, an intermediate portion 221, and a through hole 222 defined therethrough. A length of the cam 22 is less than a distance between the fixing hole 214 and the locking portion 212 of the shaft 21. A cam portion 223 is formed at the first end of the cam 22. The cam portion 223 includes a flat surface 2230, and a pair of opposite cam blocks formed on the flat surface 2230. Each cam block includes an apex portion 2231, an upright side surface 2232, a slanted curved surface 2233 opposite from the upright side surface 2232, and a step surface 2234 formed on the slanted curved surface 2233 adjacent the apex portion 2231. The curved surface 2233 ascends gradually from the flat surface 2230 to the step surface 2234. Four positioning blocks 224 are formed on an outer periphery of the second end of the cam 22. The positioning blocks 224 are evenly spaced apart from each other. A diameter of the through hole 222 is slightly larger than that of the shaft body 210 of the shaft 21.

The compression spring 23 is a cylindrical spring. A length of the compression spring 23 is less than a length of the intermediate portion 221. An inner diameter of the compression spring 23 is slightly larger than that of the intermediate portion 221, and less than a diameter of the cam portion 223. The compression spring 23 is placed around the intermediate portion 221 of the cam.

The torsion spring 24 is a cylindrical spring. An inner diameter of the torsion spring 24 is larger than a diameter of the shaft body 210 of the shaft 21. The torsion spring 24 includes an outer finger 241 and an inner finger 242. The inner finger 242 is fixed in the fixing hole 214 of the shaft 21.

The sleeve 25 is in the form of a hollow cylinder. The sleeve 25 has an open end and a semi-closed end. The sleeve 25 includes four protrusions 250 extending longitudinally from the open end thereof, and a through hole 251 defined therethrough. The protrusions 250 are interleavedly engaged with the positioning blocks 224 of the cam 22, such that the sleeve 25 is rotatable jointly with the cam 22. The through hole 251 of the sleeve 25 is coaxial with the through hole 222 of the cam 22. A diameter of the through hole 251 of the sleeve 25 is larger than that of the shaft body 210 of the shaft 21. An inner diameter of the sleeve 25 is larger than an outer diameter of the torsion spring 24. A fixing hole 252 is defined in the semi-closed end, for fixing the outer finger 241 of the torsion spring 24. A recess 253 is defined in an outer surface of the sleeve 25. The recess 253 is adapted for securely coupling the sleeve 25 to the cover of the mobile phone, so that the sleeve 25 is rotatable jointly with the cover.

The clip 26 is C-shaped, and is made of an elastic material. The clip 26 includes a hole 261, and a cutout 262 in communication with the hole 261. The hole 261 is coaxial with the through hole 252 of the sleeve 25. The clip 26 is engaged in the groove 213 of the shaft 21. A breadth of the cutout 262 is less than the diameter of shaft body 210 of the shaft 21.

Figure 4:
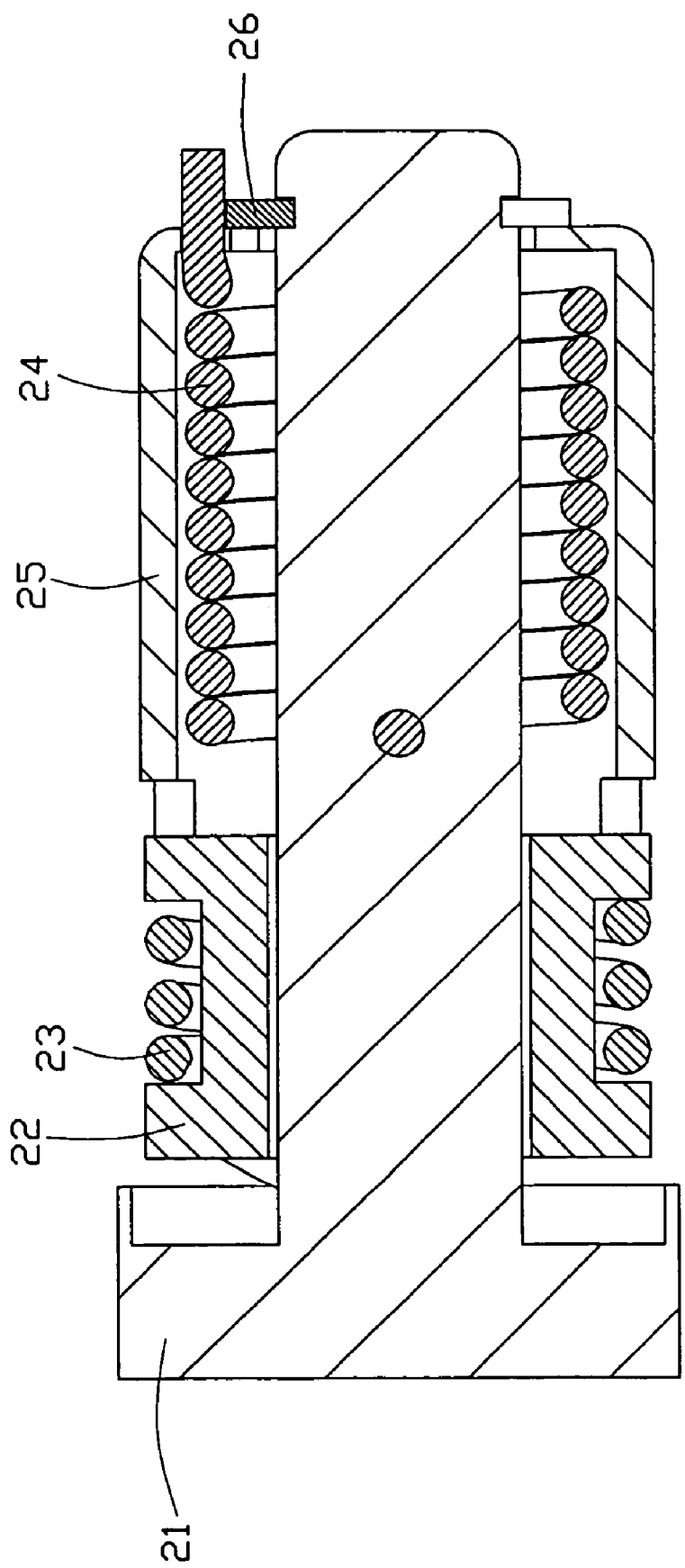
FIG. 4 is a cross-sectional view taken along line IV-IV of FIG. 3.
Figure 5:
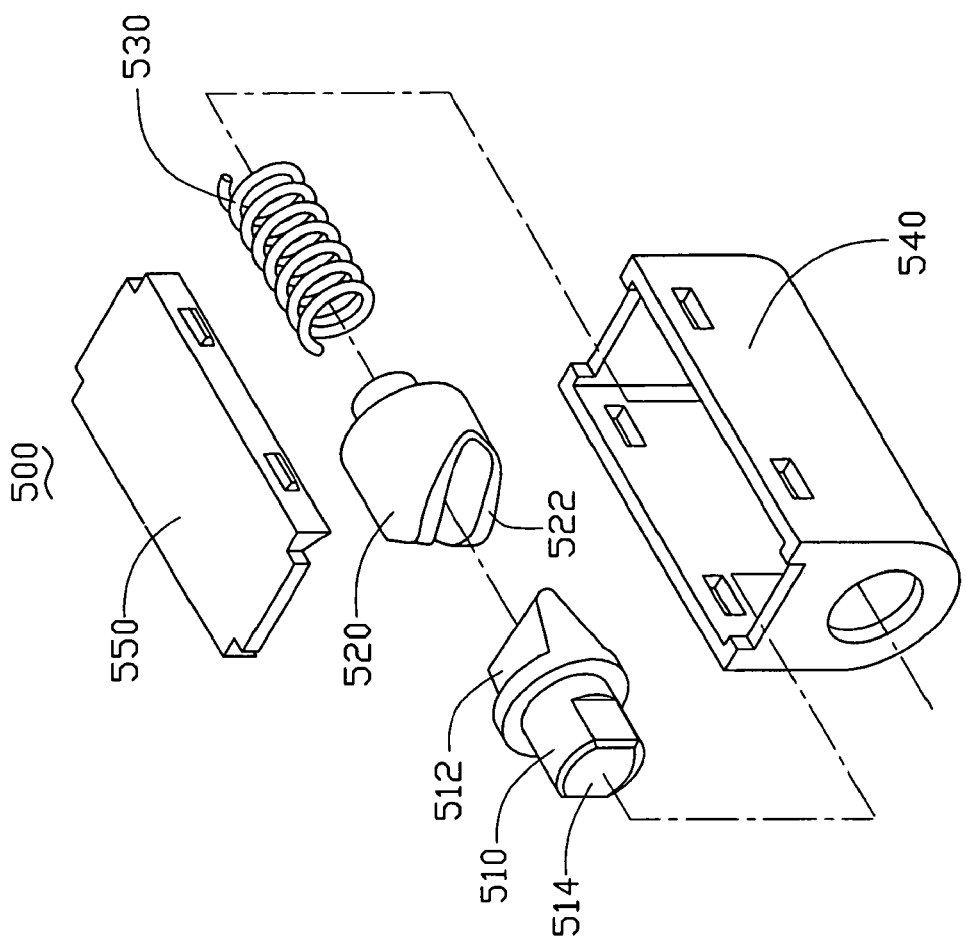
FIG. 5 is an exploded, isometric view of a conventional hinge.

Referring to FIGS. 3 and 4, in assembly of the hinge 200, the compression spring 23 is placed around the intermediate portion 221 of the cam 22. The shaft 21 extends through the through hole 222 of the cam 22, with the cam portion 223 of the cam 22 facing toward the locking portion 212 of the shaft 21. The rotatable blocks 211 of the shaft abut against the flat surface 2230 of the cam portion 223, and are rotatable between the cam blocks of the cam 22. The torsion spring 24 is received in the sleeve 25. The outer finger 241 of the torsion spring 24 is fixed in the fixing hole 252 of the sleeve 25. The shaft 21 extends through the torsion spring 24 and the through hole 251 of the sleeve 25. The inner finger 242 of the torsion spring 24 is fixed in the fixing hole 214 of the shaft 21. The first end of the sleeve 25 is coupled to the second end of the cam 22, with the protrusions 250 of the sleeve 25 being interleaved with the positioning blocks 224 of the cam 22. The compression spring 23 is biased between the cam portion 23 and the protrusions 250 of the sleeve 25. The sleeve 25 is thus axially slidable relative to the cam 22. The second end of the shaft 21 extends through the semi-closed end of the sleeve 25, with the groove 213 being exposed. The clip 26 is engaged in the groove 213 via elastic deformation of ends of the clip 26 at the cutout 262.

When the hinge 200 is assembled in a mobile phone, the locking portion 212 of the shaft 21 is securely engaged in a cavity of the main body of the mobile phone. The sleeve 25 is securely coupled to the cover of the mobile phone. When the cover is rotated up to an open position, the compression spring 23 is in a compressed state. The torsion spring 24 is in a relaxed state. The rotatable blocks 211 of the shaft 21 abut against the flat surface 2230 of the cam 22. When the cover of the mobile phone is rotated down to a closed position, the shaft 21 rotates relative to the sleeve 25, with the rotatable blocks 211 rotating on the flat surface 2230 of the cam 22. The torsion spring 24 is twisted into a torsional state. The cover is coupled to the main body by a lock mechanism of the mobile phone. The rotatable blocks 211 are rotated to abut against the upright side surfaces 2232 of the cam blocks. Consequently, once the lock mechanism of the mobile phone is released, the cover is automatically rotated up into the open position by means of the torsional spring, with the rotatable blocks 211 being rotated along the flat surface 2230. When the cover is rotated approaching the open position, the rotatable blocks 211 begin to interferingly slide on the slanted curved surfaces 2233, and the rotation of the shaft is retarded by a retarding force. The retarding force is cooperatively provided by the twisted torsion spring 24 and the compressed compression spring 23. When the cover is rotated to the open position, the rotatable blocks 211 are rotated onto the step surfaces 2234 of the cam 22.

It is believed that the present embodiment and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge, comprising:
  a shaft comprising a first end and an opposite second end, two opposite shaft rotating blocks radially projecting from the first end;
  a cam comprising a first cam end including a first end surface and two opposite cam blocks axially projecting form the first end surface and being symmetric about a center of the first end surface, an opposite second cam end, an intermediate portion connecting both with the first and second cam end, and an axial through hole defined through the cam; the cam surrounding the first end of the shaft with the shaft rotating blocks abutting against the first cam end surface and being rotatable relative to the cam between the cam blocks;
  a sleeve surrounding the shaft, and comprising a first end surrounding and engaged with the second cam end of the cam such that the sleeve is axially slidable relative to and rotatable jointly with the cam, and a second end abutting the second end of the shaft;
  a torsion spring having a first finger coupled to the shaft, and a second finger coupled to the sleeve, the torsion spring surrounding the second end of the shaft and being received in the sleeve; and
  an elastic member surrounding the intermediate portion of the cam and elastically interposed between the first end of the cam and the first end of the sleeve.

2. The binge as claimed in claim 1, wherein the shaft comprising a locking portion at the first end thereof, and the locking portion is configured for drive the shaft move jointly with a main body of a portable electronic device.

3. The hinge as claimed in claim 2, further comprising a clip, wherein the shaft defines a groove at the second end thereof, the groove engageably receiving the clip therein.

4. The hinge as claimed in claim 1, wherein each of the cam blocks comprises an upright side surface, a slanted curved surface opposite from the upright side surface, and a step surface formed on the slanted curved surface adjacent an apex of the block.

5. The hinge as claimed in claim 1, wherein the second end of the cam comprises a plurality of positioning blocks spaced apart on a periphery thereof, and the first end of the sleeve comprises a plurality of protrusions interleavedly engaged with the positioning blocks.

6. The hinge as claimed in claim 1, wherein an elastic member is a compression spring, and is configured for providing an elastic force for axially sliding the sleeve relative to the cam.

7. A mobile phone assembly, comprising:
a main body;
a shaft comprising a first end with two opposite shaft rotating blocks radially projecting therefrom and a second opposite end, the first end of the shaft secured to the main body;
a cam comprising a first cam end including a first end surface and two opposite cam blocks axially projecting from the first end surface and being symmetric about a center of the first end surface, a second opposite cam end, an intermediate portion connecting both with the first and second cam ends and an axial through hole define through the cam; the cam surrounding the first end of the shaft with the shaft rotating blocks abutting against the first cam end surface and being rotatable relative to the cam between the cam blocks;
a sleeve surrounding the shaft, and comprising a first end surrounding and engaged with the second cam end of the cam such tat the sleeve is axially slidable relative to and rotatable jointly with the cam, and a second end abutting against the second end of the shaft;
a cover secured to the second end of the sleeve;
a torsion spring having a first finger coupled to the shaft, and a second finger coupled to the sleeve, the torsion spring surrounding a portion adjacent the second end of the shaft and being received in the sleeve; and
an elastic member surrounding the intermediate portion of the earn and springably interposed between the first end of the cam and the first end of the sleeve.

8. The mobile phone assembly as claimed in claim 7, wherein the shaft comprises a first locking portion at the first end thereof, the first locking portion being securely coupled to the main body.

9. The mobile phone assembly as claimed in claim 8, wherein the second end of the sleeve comprises a second locking portion securely coupled to the cover.

10. The mobile phone assembly as claimed in claim 7, further comprising a clip, wherein the shaft defines a groove at the second end thereof, the groove engageably receiving the clip therein.

11. The mobile phone assembly as claimed in claim 10, wherein the clip is C-shaped.

12. The mobile phone assembly as claimed in claim 7, wherein each of the cam blocks comprises an upright side surface, a slanted curved surface opposite from the upright side surface, and a step surface formed on the slanted curved surface adjacent an apex of the block.

13. The mobile phone assembly as claimed in claim 7, wherein the second end of the cam comprises a plurality of positioning blocks spaced apart on a periphery thereof, and the first end of the sleeve comprises a plurality of protrusions interleavedly engaged with the positioning blocks.

14. The mobile phone assembly as claimed in claim 7, wherein an elastic member is a compression spring, and is configured for providing an elastic force for axially sliding the sleeve relative to the cam.

15. An electronic device comprising:
a main body enclosing a part of said electronic device;
a cover disposed next to said main body and enclosing another part of said electronic device; and
a hinge mechanism disposed between said main body and said cover so as to interconnect said cover with said main body and allow said cover movable relative to said main body about said hinge mechanism, said hinge mechanism comprising a block formed with a shaft to be movable together with said main body by said shaft, and a cam movable together with said cover and attachable to a sleeve enclosing a part of said shaft, said block being engagable with said cam so as to conduct movement of said cam and said cover, at least two resilient members disposed respectively beside at least one of said cam and said block so that one of said at least two resilient members is installed around said cam and engagable with said sleeve by at least one protrusion axially projecting from said sleeve and extending against said cam and controls axial movement of said at least one of said cam and said block, and another of said at least two resilient members controls rotary movement of another of said cam and said block and is attachable to said cam so as to be movable together with said cover by said sleeve.

16. The electronic device as claimed in claim 15, wherein said one of said at least two resilient members is a compression spring and said another of said at least two resilient members is a torsion spring.

* * * * *

UNITED STATES PATENT AND TRADEMARK OFFICE
CERTIFICATE OF CORRECTION

PATENT NO.      : 7,634,838 B2
APPLICATION NO. : 11/253894
DATED           : December 22, 2009
INVENTOR(S)     : Ge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Ninth Day of November, 2010

David J. Kappos
*Director of the United States Patent and Trademark Office*